(12) United States Patent
Solt et al.

(10) Patent No.: US 8,176,291 B1
(45) Date of Patent: May 8, 2012

(54) BUFFER MANAGEMENT ARCHITECTURE

(75) Inventors: Yosef Solt, Misgav (IL); Sorel Horovitz, Nes Ziona (IL)

(73) Assignee: Marvell Israel (MISL) Ltd., Yokneam (IL)

( * ) Notice: Subject to any disclaimer, the term of this patent is extended or adjusted under 35 U.S.C. 154(b) by 0 days.

(21) Appl. No.: 12/721,305

(22) Filed: Mar. 10, 2010

Related U.S. Application Data

(63) Continuation of application No. 10/809,537, filed on Mar. 24, 2004, now Pat. No. 7,689,793.

(60) Provisional application No. 60/468,004, filed on May 5, 2003.

(51) Int. Cl.
*G06F 12/00* (2006.01)
(52) U.S. Cl. ......... 711/170; 711/154; 370/229; 714/776
(58) Field of Classification Search ............... 711/154, 711/170; 370/229; 714/776
See application file for complete search history.

(56) References Cited

U.S. PATENT DOCUMENTS

| | | | |
|---|---|---|---|
| 5,913,042 A | 6/1999 | Shemla et al. | |
| 5,913,215 A | 6/1999 | Rubinstein et al. | |
| 5,923,660 A | 7/1999 | Shemla et al. | |
| 6,125,434 A * | 9/2000 | Willard et al. | 711/170 |
| 6,240,065 B1 | 5/2001 | Medina et al. | |
| 6,266,686 B1 | 7/2001 | Bistry et al. | |
| 6,279,084 B1 | 8/2001 | VanDoren et al. | |
| 6,347,348 B1 | 2/2002 | Webber | |
| 6,515,963 B1 | 2/2003 | Bechtolsheim et al. | |
| 6,539,024 B1 | 3/2003 | Janoska et al. | |
| 6,549,541 B1 | 4/2003 | Sainio et al. | |
| 6,556,578 B1 | 4/2003 | Silberschatz et al. | |
| 2002/0087822 A1 * | 7/2002 | Butterworth | 711/170 |
| 2003/0093629 A1 * | 5/2003 | Chen et al. | 711/154 |

* cited by examiner

*Primary Examiner* — Matthew Bradley

(57) ABSTRACT

Systems and apparatus for managing buffers in a buffer memory are described. In at least one aspect, a system includes a buffer memory including a plurality of buffers; an allocation memory including a plurality of allocation data elements associated with the plurality of buffers; an allocation clear register coupled with the allocation memory; a reclaim memory including a plurality of reclaim data elements each associated with an allocation data element and corresponding buffer; a reclaim clear register coupled with the reclaim memory; an allocation register configured to receive one or more allocation data elements from the allocation memory; and a buffer manager.

12 Claims, 5 Drawing Sheets

BUFFER MANAGEMENT ARCHITECTURE

CROSS-REFERENCE TO RELATED APPLICATIONS

This application is a continuation of U.S. application Ser. No. 10/809,537, filed Mar. 24, 2004, now U.S. Pat. No. 7,689,793, which claims the benefit of priority to U.S. Provisional Application Ser. No. 60/468,004, filed on May 5, 2003.

BACKGROUND

Switches may be used in a computer network to create a network among a plurality of end nodes (e.g., workstations). A switch includes a number of ports, each of which may be connected to an end node or another switch in the network. The switch channels incoming data from an input port to the specific output port that will take the data toward its intended destination.

The switch may temporarily store received data (e.g., in the form of packets) in a buffer memory while the switch determines how, when, and through which port to retransmit the packets. Once a packet has been transmitted to its destination, the packet can be cleared from the memory. Since the buffer memory can only buffer a finite number of packets, the switch may include a buffer management module to manage buffers in the buffer memory.

SUMMARY

A network switch may include a buffer management module to manage buffers in a buffer memory. The buffer management module may include an Allocation SRAM and a Reclaim SRAM. Each buffer in the buffer memory may be associated with a corresponding data element, e.g., a bit, in the Allocation SRAM and Reclaim SRAM. A line including bits indicating available buffers in the Allocation SRAM may be written to allocation register, and the buffer management module may allocate buffers from the allocation register in response to allocation requests. The buffer management module may identify bits in the allocation register having a value corresponding to an available buffer, change the value of the bit to a value corresponding to an allocated buffer, and allocate the buffer associated with the bit. The buffer management module may clear buffers in response to clear requests by identifying the bit in the allocation register or Allocation SRAM (and Reclaim SRAM), and changing the value of the bit to the value corresponding to an available buffer. If the bit is in the SRAMs rather than the allocation register, the buffer management module may write the line including the bit to a clear map bit register and clear the bit there. The buffer management module may monitor the lines in the Allocation SRAM for available lines, i.e., lines including at least one available buffer. When the all of the buffers in the line in the allocation register are allocated, the buffer management module may write the next available line into the allocation register, and allocate buffers from the new line.

A reclaim module may age bits in the Reclaim SRAM. The reclaim module may reclaim buffers by searching corresponding lines in the Allocation SRAM and Reclaim SRAM and comparing the values of bits in the two lines. The reclaim module may search the bits in the Reclaim SRAM, identify one or more buffers to reclaim, set the value of the bit associated with the buffer to the value corresponding to an available buffer, and in a subsequent search, compare the bits in the Allocation SRAM to the associated bits in the Reclaim SRAM. The reclaim module may change the value of an bits in the Allocation SRAM with a value corresponding to an allocated buffer to the value corresponding to an available buffer in response to the associated bit in the Reclaim SRAM having the value corresponding to an available buffer.

DETAILED DESCRIPTION

Figure 1:
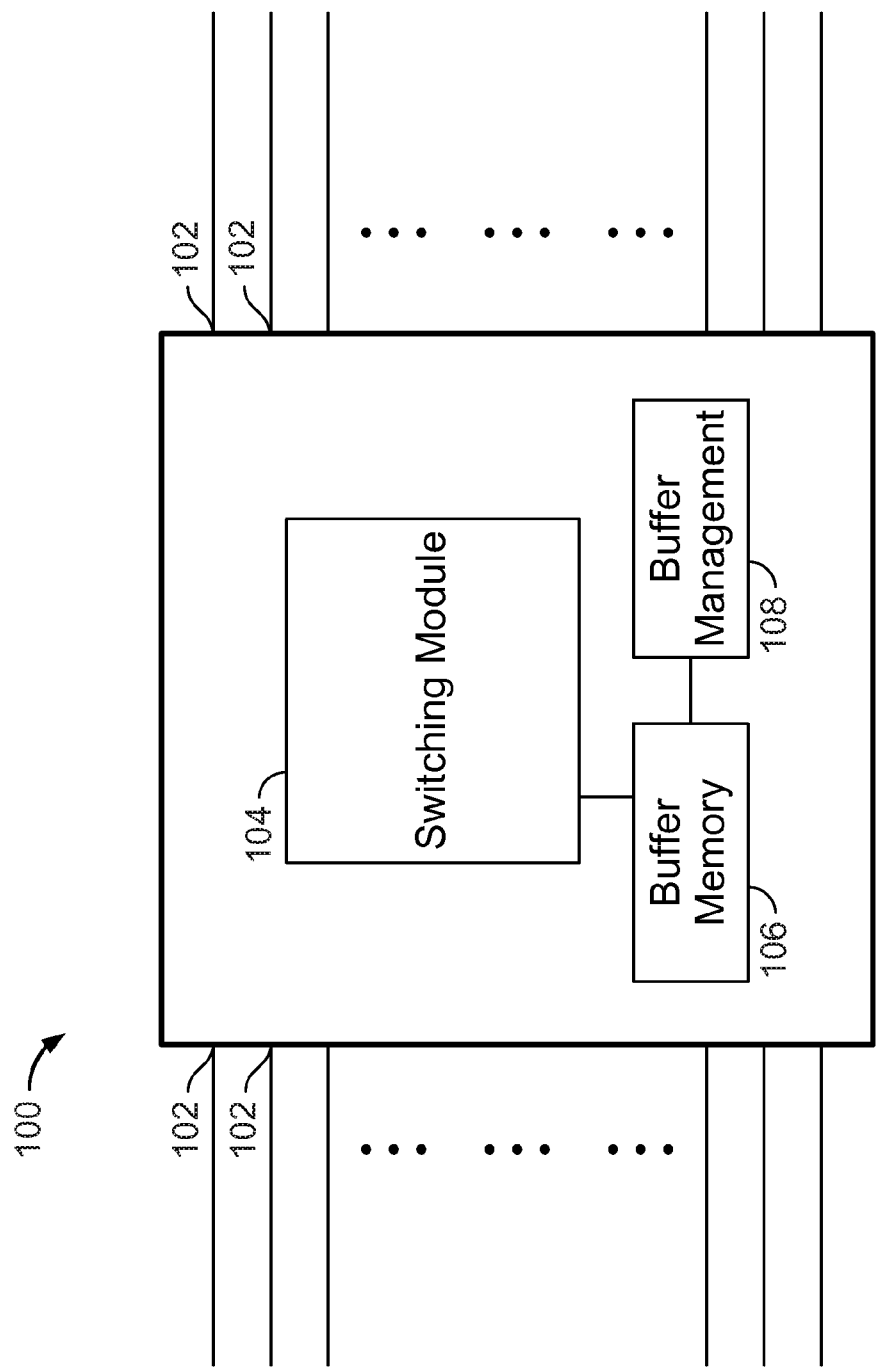
FIG. 1 is a block diagram of a network switch including a buffer management module.

FIG. 1 is a block diagram of a network switch 100 according to an embodiment. The switch includes a number of ports 102, each of which may be connected to an end node (e.g., a workstation) or another switch in a computer network.

The switch 100 may include a switching module 104 to switch/route received packets. When a packet is received, the switching module may build a descriptor from header data in the packet and store the packet in a buffer memory 106. The buffer memory 106 may include contiguous buffers, each large enough to store a packet of a given size a portion of a packet. A buffer management module 108 manages buffers in the memory to ensure that buffers are available for incoming packets.

Figure 2:
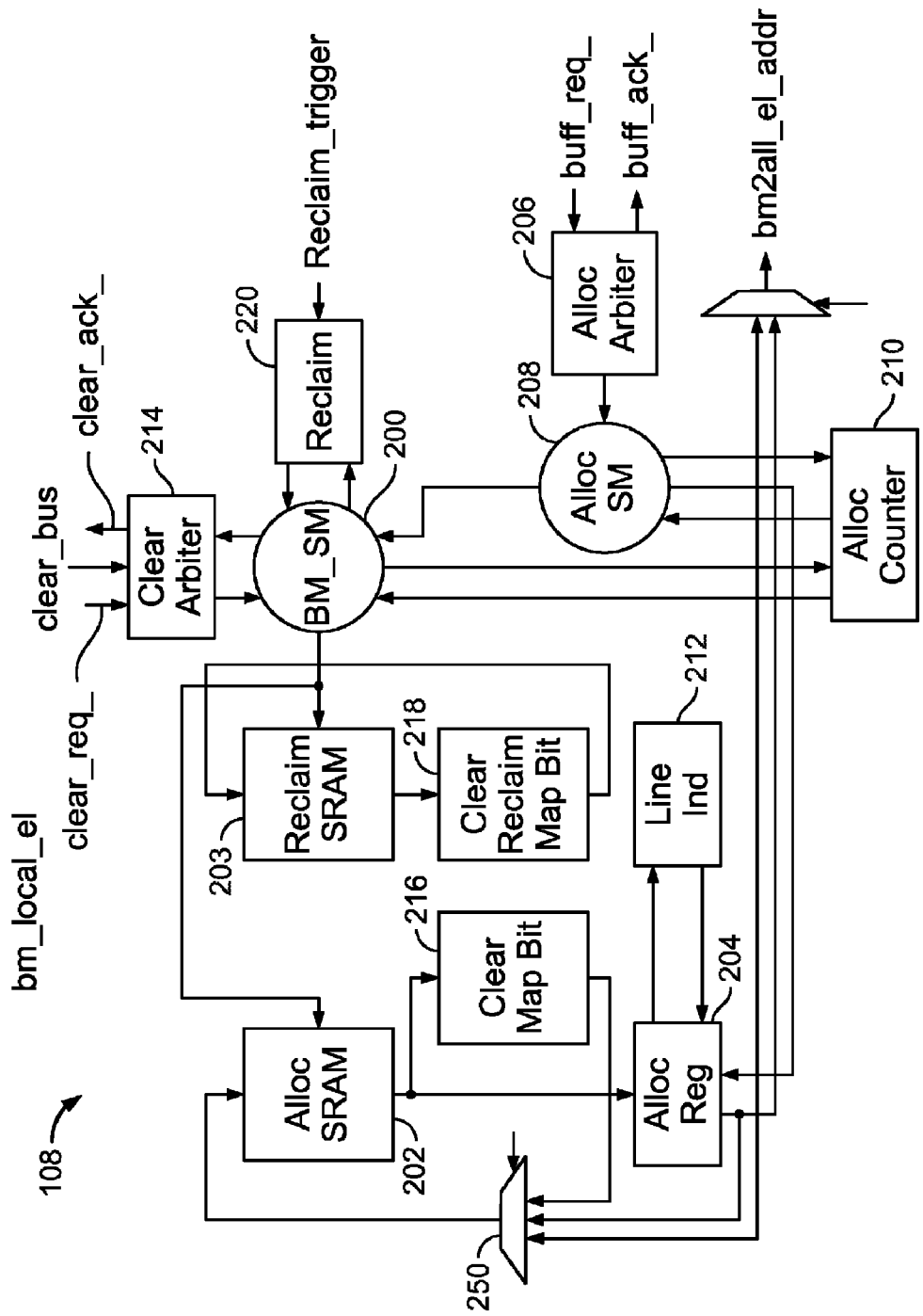
FIG. 2 is a block diagram of the buffer management module.

FIG. 2 is a block diagram of a buffer management module 108 according to an embodiment. The buffer management module 108 supplies (allocates) available buffers in the buffer memory 106 in response to buffer requests and clears allocated buffers in response to clear requests. The buffer memory 106 may buffer short and long packets. Packet types (short/long) may be assigned to the ports. The buffer management module 108 may allocate (and clear) short and long packets in a similar manner. The buffer management module 108 may provide a reclaim mechanism to reclaim buffers that may become stuck in the system (i.e., fail to release) due to some malfunction. For example, data may not be transmitted if there are some errors in the network, such as a port being broken or a switch connected to a port being removed from the network. In either case, the buffers associated with those ports need to be cleared or else the associated buffers will become stuck.

The buffer management module 108 may include an Allocation SRAM 202 and a Reclaim SRAM 203. In an embodiment, the SRAMs are 128×128 SRAMs (16 kbits). Each buffer in the buffer memory 106 is associated with a bit in the Allocation SRAM 202. The number of available buffers in the buffer memory 106 may be smaller than the number of available bits in the Allocation SRAM 202. In that case, a number of lines in the Allocation SRAM 202 and Reclaim SRAM 203 may be masked off. A translation module may perform a translation between bit numbers in the Allocation SRAM 202 and the corresponding addresses of buffer locations in the buffer memory 106. The following description may refer to bit numbers in the Allocation SRAM 202 and the corresponding locations where the packets are buffered in the buffer memory 106 as "buffers".

One of the lines from the Allocation SRAM 202 may be stored in an allocation register 204 (e.g., a 128-bit register for the 128×128 Allocation SRAM 202) at a time. Buffers may be taken from empty spaces (bit=0) in the line currently in the allocation register 204 in response to buffer requests (buff_req_). When allocated, the value of the bit may be set to "1", indicating a full buffer. A "rd_pointer" signal identifies which line from the Allocation SRAM 202 is in the allocation register 204.

The allocation register 204 may include separate long and short allocation registers for the allocation of long and short packets, respectively.

Figure 3:
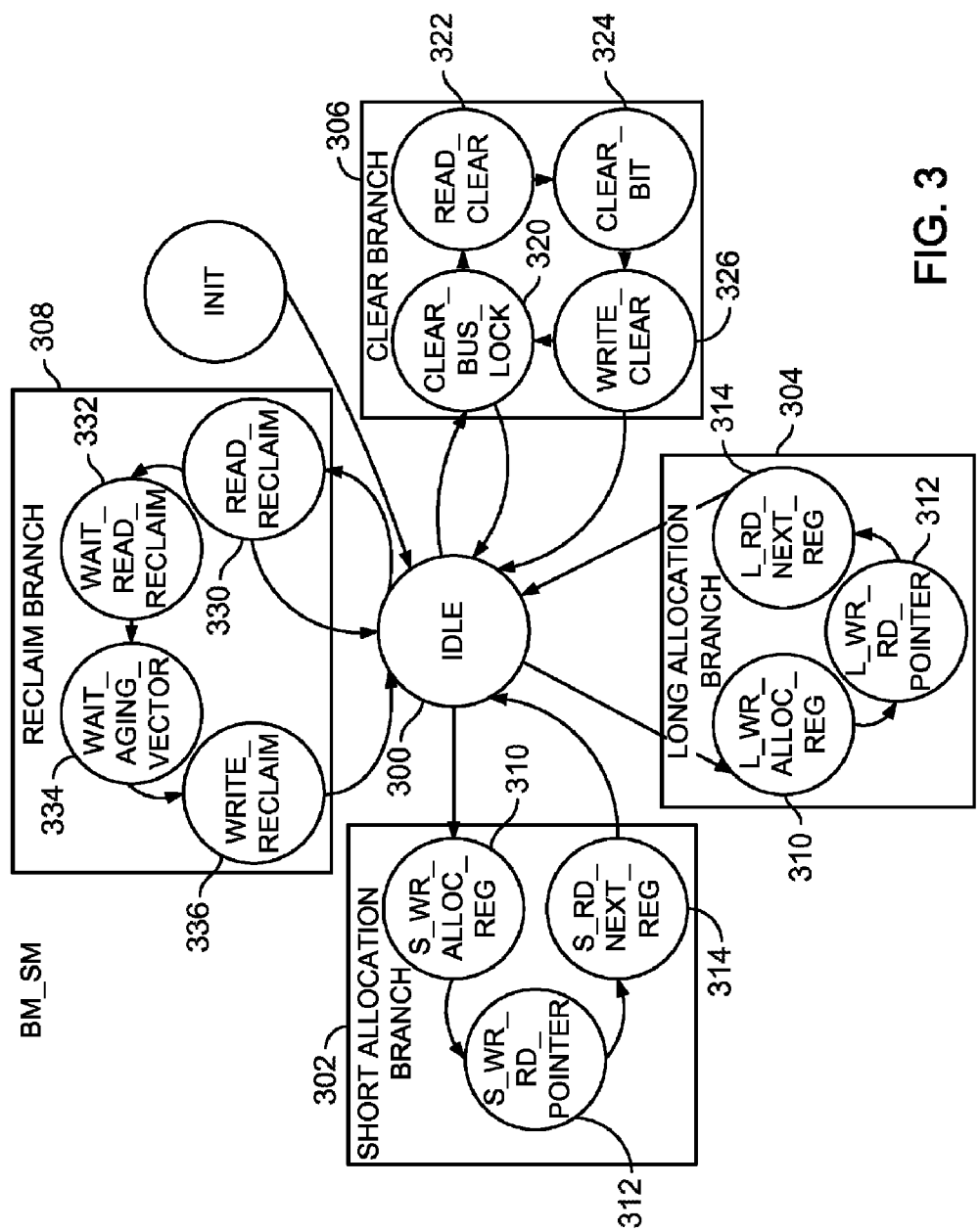
FIG. 3 illustrates the states in a buffer management state machine in the buffer management module.

The buffer management module 108 may include a buffer management state machine (BMSM) 200. The BMSM 200 may control which module in the buffer management module 108 has access to the Allocation SRAM 202 and/or Reclaim SRAM 203 and/or allocation register 204 (for clearing buffers from the long/short allocation registers). FIG. 3 illustrates the branches in the BMSM 200 and corresponding states the BMSM 200 may transition between. The buffer management module 108 may include a short allocation branch 302, a long allocation branch 304, a clear branch 306, and a reclaim branch 308.

An allocation arbiter 206 handles buffer requests from clients. The allocation arbiter 206 may be a first-come-first-serve (FCFS) arbiter. The allocation arbiter 206 decides which requests are to be forwarded to an allocation state machine (Alloc_SM) 208. The Alloc_SM 208 may supply the next empty buffer in the line currently in the allocation register 204. The allocation of the buffers may be done in a "forward" manner, e.g., from buffer number 0 to the last available buffer. A buffer that was cleared from the allocation register may be reallocated again. The allocation/clear from the allocation registers may be done in the same cycle in parallel.

When the line in the allocation register 204 is full (i.e., all bits=1), the BMSM 200 issues a control signal to write the full line in the allocation register 204 to the Allocation SRAM 202 and to the corresponding line in the Reclaim SRAM 203 (state "WR_ALLOC_REG" 310 in FIG. 3). The next available line in the Allocation SRAM 202 (i.e., a line including at least one empty buffer) is identified and written to the allocation register 204. The rd_pointer is updated to the address of the new line ("WR_RD_POINTER" 312). New buffers may then be allocated from the new line in the allocation register 204 ("RD_NEXT_REG" 314).

Allocation counters 210 may be used to count the number of allocated buffers. The allocation counters 210 may be used to indicate when there are no more buffers available. A maximum number of buffers may be allocated for a particular port to prevent other ports from being starved. The allocation counters 210 may also be used to count the number of allocated buffers per port and indicate to the allocation arbiter 206 when a port has been allocated its maximum number of buffers.

The next available line (i.e., with at least one empty buffer) in the Allocation SRAM 202 may be determined by a line indication module 212 coupled to the allocation register 204. The next available line is determined through a search of a free line vector generated by the line indication module 212. The free line vector may have a number of bits corresponding to the number of lines in the Allocation SRAM 202 (e.g., 128). Initially, all bits in the free line vector may be set to "0", indicating that all lines include empty buffers. When a line is written to the Allocation SRAM 202 from the allocation register 204 (i.e., when the line is full), a "1" may be written to the bit location in the free line vector corresponding to that line. If a clear operation (described below) is performed on a line in the Allocation SRAM 202 to clear a bit, a "0" may be written to the bit location in the free line vector corresponding to that line. Thus, full lines are indicated by "1" and lines with one or more empty buffers are indicated by "0" in the free line vector. The next available line (with at least one empty buffer) can be determined by searching the free line vector.

A clear arbiter 214 may handle clear requests (clear_req_). The clear arbiter may be an FCFS arbiter. The clear arbiter 214 decides which clear request will be forwarded to the BMSM 200. The BMSM 200 checks to see if the buffer to be cleared is in the allocation register 204 ("CLEAR_BUS_LOCK" 320). If so, the buffer is cleared from the allocation register 204, and the BMSM 200 returns to an idle state 300. However, if the buffer to be cleared is not in the allocation register 204, the line containing the buffer is read from the Allocation SRAM 202 into a clear map bit register 216 and the corresponding line in the Reclaim SRAM 203 is read into a reclaim clear map bit register 218 ("READ_CLEAR" 322). The bit is then cleared in both registers ("CLEAR_BIT" 324) and the line is rewritten to the Allocation SRAM 202 and Reclaim SRAM 203 ("WRITE_CLEAR" 326). A multiplexer 250 controls access to the Allocation SRAM 202 from the allocation register 204 and the clear map bit register 203.

If the specific buffer subject to the clear request was not allocated, or already cleared by the reclaim mechanism, a signal is transmitted to the allocation counters 210 to prevent them from being decremented. There may also be an interrupt indicating that a malfunction occurred.

The reclaim module 220 may operate in two modes: a trigger mode and an automatic mode. A reclaim trigger may be issued periodically or when needed. In response to the reclaim trigger, the entire Allocation SRAM 202 is searched in one pass, and any full buffers in the Allocation SRAM 202 are written to the corresponding bit locations in the Reclaim SRAM 203.

In the automatic mode, the lines in the Reclaim SRAM 203 may be searched continuously in a loop fashion (i.e., from line 0 to the last unmasked line and back to line 0). A configurable timer may be used to set the time between searching between lines. The reclaim module 220 reads a line from the Allocation SRAM 202 and from the Reclaim SRAM 203 ("READ_RECLAIM" 330). The reclaim module 220 then waits for the data from the Allocation SRAM 202 and from the Reclaim SRAM 203 ("WAIT_READ_RECLAIM" 332). The reclaim module 220 compares the line in the Reclaim SRAM 203 to the corresponding line in the Allocation SRAM 202, and calculates an aging vector ("WAIT_AGING_VECTOR" 334). The reclaim module 220 may set bits in the aging vector corresponding to buffers that should be aged to "0". The reclaim module 220 writes the line back to the Reclaim SRAM 203 ("WRITE_RECLAIM" 336).

In subsequent searches in the trigger mode, the lines in the Allocation SRAM 202 and the Reclaim SRAM 203 are compared. As described above, when a new line is written back from the allocation register 204 to the Allocation SRAM 202 (a full line), it is also written to the Reclaim SRAM 203. Also, if a buffer is cleared from the Allocation SRAM 202, it is also cleared from the Reclaim SRAM 203. During the search in a line in the Reclaim SRAM 203, a buffer is set (="1"), will be reset (="0"). In the next pass, when the same line is searched again, if a bit corresponding to a buffer is set (="1") in the Allocation SRAM 202 and the corresponding bit in the Reclaim SRAM 203 is reset (="0"), the buffer is cleared by resetting the bit in the Allocation SRAM 202 to "0", freeing that buffer to be allocated. This may prevent buffers from becoming stuck in the system. Also, the counter are decremented by the number of cleared buffers.

In both the trigger mode and the automatic mode, the line in the Allocation SRAM 202 (and Reclaim SRAM 203) currently in the allocation register 204 is skipped during the search through the SRAMs. This may prevent recently allocated buffers from being mistakenly cleared.

Figure 4:
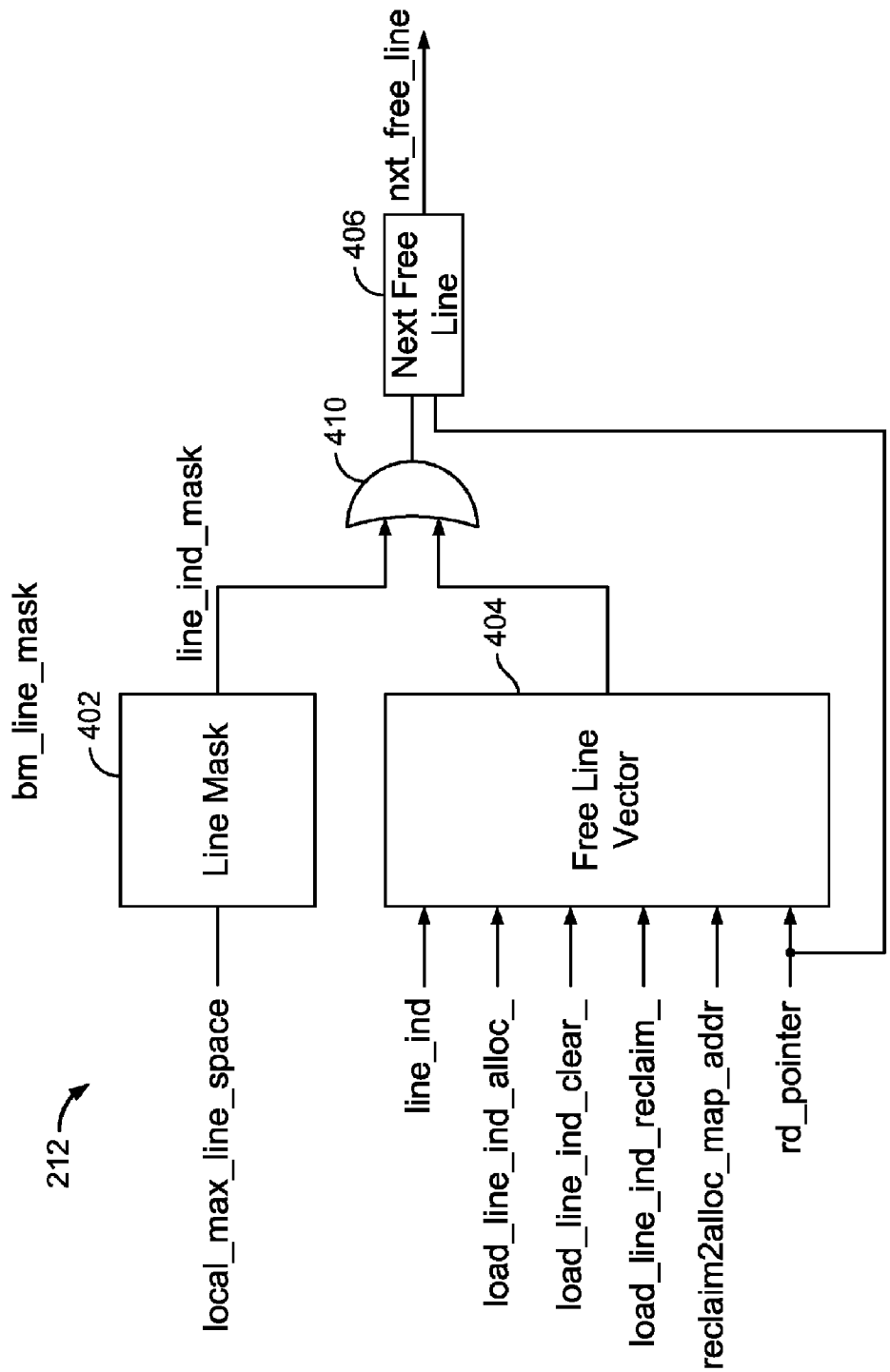
FIG. 4 is a block diagram of a line indication module in the buffer management module.

FIG. 4 is a block diagram of a line indicator module according to an embodiment. The line indicator module may include a line mask module 402, a free line vector module 404, an OR gate 410, and a next free line module 406.

The number of available buffers in the buffer memory 106 may be smaller than the number of available bits in the Allocation SRAM 202. In that case, a number of lines in the Allocation SRAM 202 may be masked off by a "line_ind_mask" signal generated by the line mask module 402 based on a "local_max_line_space" input.

The main inputs to the free line vector module are "line_ind" and "rd_pointer". The line_ind input represents the entire possible allocation space, including the masked lines. The rd_pointer input is the address of the line in the allocation register 204 and provides the starting pointer for the search for the next empty line. The free line vector module 404 operates on the line_ind input to generate the 128-bit free line vector used to determine the next available line.

When a full line from the allocation register 204 is written back to the Allocation SRAM 202, the BMSM 200 generates a "load_line_ind_alloc" control signal, which indicates that the particular line is full. The free line vector module 404 sets the bit corresponding to the full line to "1". If a buffer is cleared by the BMSM 200 (in response a clear command), a "load_line_ind_clear" control signal sets the bit corresponding to the line containing the buffer to "0".

If a buffer is aged by the reclaim mechanism, the "load_line_ind_reclaim_" control signal sets the bit corresponding to the line containing the buffer to "0". This line is identified by a "reclaim2alloc_map_addr" signal.

Figure 5:
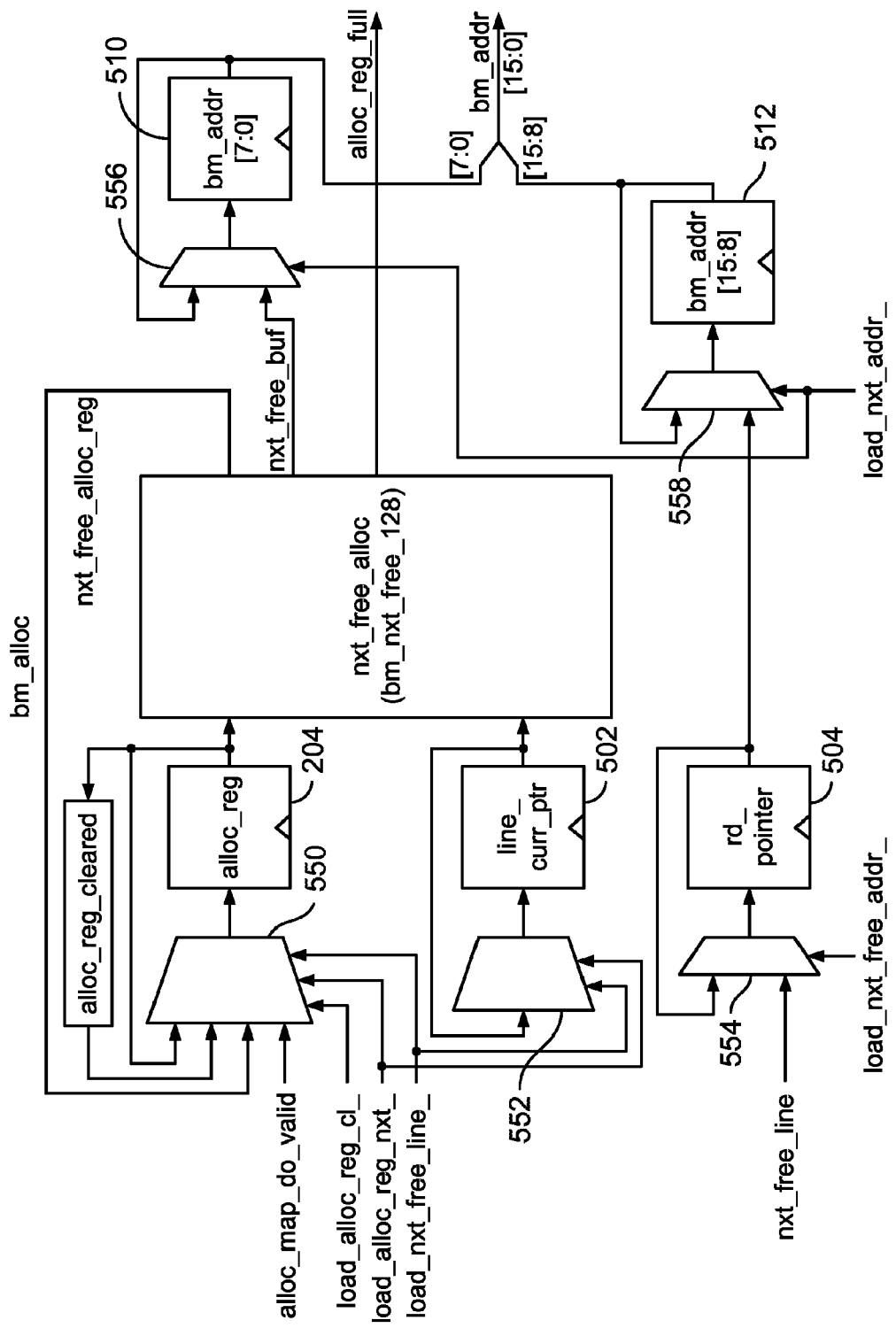
FIG. 5 is a block diagram of an allocation section of the buffer management module.

FIG. 5 is a block diagram of an allocation section according to an embodiment. A line_curr_ptr register 502 holds a pointer to the last allocated buffer in the allocation register 204, which is used as a starting point for the search for the next empty buffer in the line. The input to the allocation register 204 is controlled by a multiplexer 550, and the input to the line_curr_ptr register 502 is controlled by a multiplexer 552. A rd_pointer register 504 holds the pointer to the address of the Allocation SRAM 202 line that is loaded into the allocation register 204. The input to the line_curr_ptr register is controlled by a multiplexer 554. The Alloc_SM 208 issues a "load_nxt_addr_" control signal when a new buffer should be allocated. This signal locks the buffer pointer to the next empty buffer in the allocation register 204 into a bm_addr[7:0] 510 register and the rd_pointer address into a bm_addr[15:8] 512, the inputs to which are controlled by multiplexers 556 and 558, respectively. The combined address bm_addr[15:0] is the address of the buffer to be allocated.

After the allocation of a buffer, the allocation register 204 is updated and a new empty buffer is searched. The allocation SM issues a "load_alloc_reg_nxt_" control signal to lock the updated line in the allocation register 204 and update the line_curr_ptr register 502.

When a buffer in the allocation register 204 is to be cleared, the BMSM 200 issues a "load_alloc_reg_cl_" control signal, and the buffer at the addresses provided on the clear bus (clear_bus_arb_buf_data) is cleared. An allocation and clear to the allocation register may be done in parallel in the same cycle.

When the line in the allocation register 204 is full, the BMSM 200 issues a "load_nxt_free_addr" control signal. This loads the rd_pointer register 504 with the nxt_free_line signal from the free line vector module 212 (FIG. 4). The BMSM 200 issues a "load_nxt_free_line_" signal to lock the new line in the allocation register 204 and update the line_curr_ptr register 502.

A number of embodiments have been described. Nevertheless, it will be understood that various modifications may be made without departing from the spirit and scope of the invention. For example, more than one bit may be used to represent the individual buffers. Also, other values may be used to indicate full and empty buffers. Accordingly, other embodiments are within the scope of the following claims.

What is claimed is:

1. A system comprising:
   a buffer memory including a plurality of buffers;
   an allocation memory including a plurality of allocation data elements associated with the plurality of buffers;
   an allocation clear register coupled with the allocation memory;
   a reclaim memory including a plurality of reclaim data elements each associated with an allocation data element and corresponding buffer;
   a reclaim clear register coupled with the reclaim memory;
   an allocation register configured to receive one or more allocation data elements from the allocation memory; and
   a buffer manager configured to:
      identify, in the allocation register, at least one allocation data element indicative of an available buffer in the buffer memory,
      set the at least one identified allocation data element to indicate the available buffer has been allocated,
      receive a clear request to clear an allocated buffer,
      determine whether an allocation data element associated with the allocated buffer is stored in the allocation register,
      if the allocation data element is stored in the allocation register, set the allocation data element in the allocation register and associated reclaim data element in the reclaim memory to indicate the allocated buffer is available, and
      if the allocation data element is not stored in the allocation register, read the allocation data element associated with the allocated buffer from the allocation memory, write the allocation data element to the allocation clear register and the associated reclaim data element to the reclaim clear register, and erase the written allocation data element and reclaim data element from the allocation clear register and reclaim clear register, respectively.

2. The system of claim 1, further comprising a reclaim module configured to:
   identify at least one aged buffer to be reclaimed; and
   set a reclaim data element in the reclaim memory associated with the at least one aged buffer to be reclaimed to indicate the aged buffer is available.

3. The system of claim 2, wherein the reclaim module is configured to identify at least one aged buffer to be reclaimed based on an aging vector, the aging vector determined based on a comparison between one or more allocated data elements in the allocation memory and one or more reclaim data elements in the reclaim memory.

4. The system of claim 3, wherein:
   the reclaim module is configured to set a bit in the aging vector corresponding to the aged buffer to be reclaimed, and write the bit to the reclaim memory; and the buffer manager is configured to set an allocation data element associated with the reclaim data element to indicate the aged buffer is available.

5. The system of claim 1, wherein:
the plurality of allocation data elements are arranged in a plurality of lines in the allocation memory; and
the allocation register is configured to receive, from the allocation memory, a line containing the one or more allocation data elements with at least one allocation data element indicative of an available buffer.

6. The system of claim 5, wherein:
the plurality of reclaim data elements are arranged in a plurality of lines in the reclaim memory; and
each line in the reclaim memory corresponding to the line in the allocation memory is configured to be updated when the one or more allocation data elements is changed.

7. The system of claim 1, wherein the buffer manager is further configured to:
monitor the one or more allocation data elements stored in the allocation register; and
write the one or more allocation data elements to the allocation memory when the one or more buffers associated with the one or more allocation data elements stored in the allocation register have been allocated.

8. An apparatus comprising:
an allocation memory including a plurality of allocation data elements associated with a plurality of buffers;
a reclaim memory including a plurality of reclaim data elements each associated with an allocation data element and corresponding buffer;
a reclaim module configured to:
identify one or more reclaim data elements indicative of an available buffer, and
set one or more allocation data elements corresponding to the one or more identified reclaim data elements to indicate the available buffer;
an allocation arbiter to receive one or more requests to allocate the available buffer and determine which request is to be fulfilled; and
an allocation counter configured to monitor a number of buffers that have been allocated to a communications port, and communicate with the allocation arbiter that the number of buffers has reached a maximum number allowed for the port.

9. The apparatus of claim 8, wherein the reclaim module is configured to:
identify one or more allocation data elements indicative of an allocated buffer; and
set one or more reclaim data element corresponding to the one or more allocation data element to indicate the allocated buffer.

10. The apparatus of claim 8, further comprising an allocation register configured to receive a first set of allocation data elements from the allocation memory,
wherein the allocation register is configured to receive a second set of allocation data elements from the allocation memory when buffers corresponding to the allocation data elements in the first set have been allocated.

11. The apparatus of claim 10, wherein the first set of allocation data elements is written back to the allocation memory before receiving the second set of allocation data elements.

12. The apparatus of claim 10, further comprising a clear arbiter configured to receive one or more clear requests for clearing one or more allocated buffers corresponding to one or more allocation data elements in the first set.

\* \* \* \* \*